Oct. 22, 1968  E. F. ZINK  3,406,848
SELF-LOADING VEHICLE
Original Filed Jan. 28, 1963  2 Sheets-Sheet 1

*INVENTOR.*
EDWARD F. ZINK

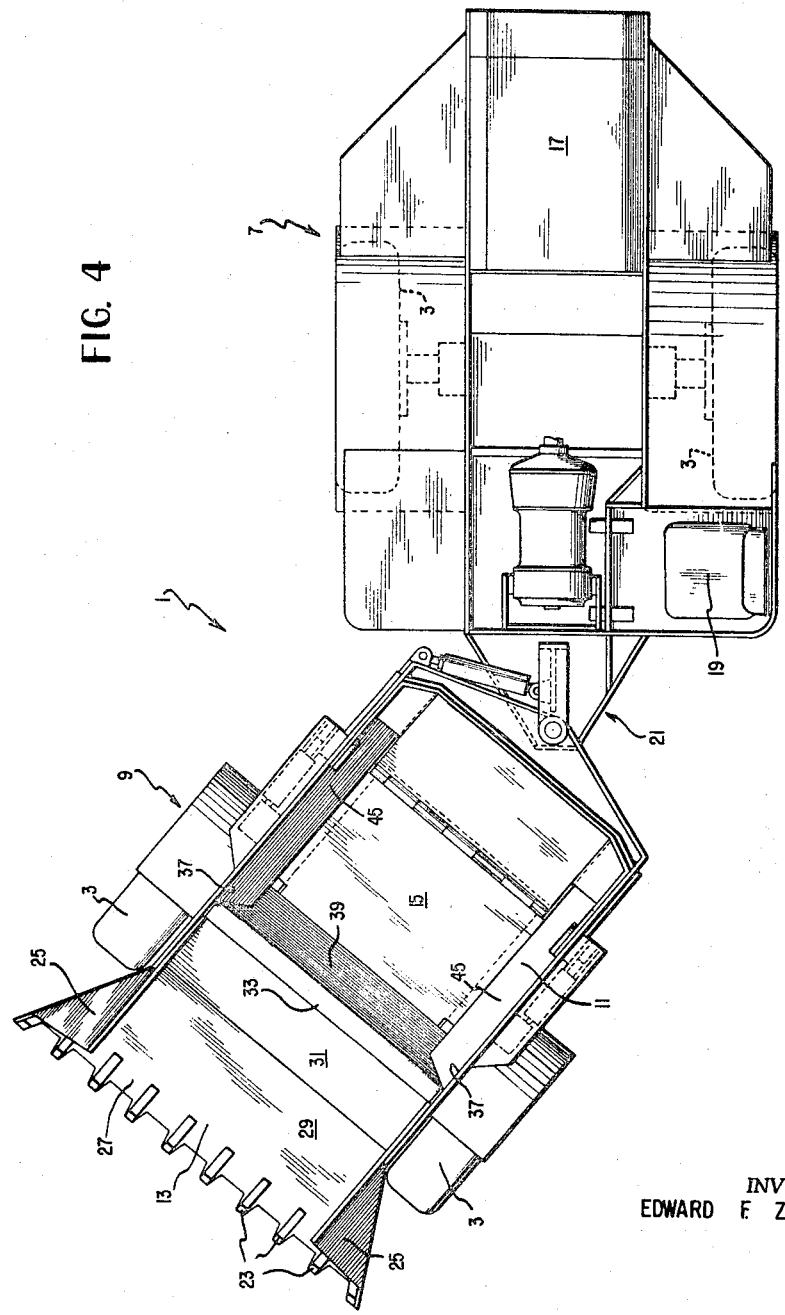

United States Patent Office 3,406,848
Patented Oct. 22, 1968

3,406,848
SELF-LOADING VEHICLE
Edward F. Zink, Knoxville, Tenn., assignor, by mesne assignments, to Joy Manufacturing Company, Pittsburgh, Pa., a corporation of Pennsylvania
Application Nov. 17, 1966, Ser. No. 595,221, now Patent No. 3,353,693, dated Nov. 21, 1967, which is a division of application Ser. No. 526,013, Jan. 18, 1966, which in turn is a continuation of application Ser. No. 254,385, Jan. 28, 1963. Divided and this application Apr. 13, 1967, Ser. No. 630,566
10 Claims. (Cl. 214—78)

ABSTRACT OF THE DISCLOSURE

A vehicle having mobile support means rotatable about an axis and a shovel portion pivotable about an axis substantially the same as the first axis.

---

This application is a division of U.S. patent application serial number 595,221 filed November 17, 1966 now U.S. patent 3,353,693 which is a division of U.S. patent application 526,013 filed January 18, 1966 now patent number 3,323,665 which patent is a continuation of U.S. patent application 254,385 filed January 28, 1963 now abandoned.

In the drawings:

FIGURE 4 is a top plan view of the front body portion of the vehicle of FIGURE 1.

Figure 1:
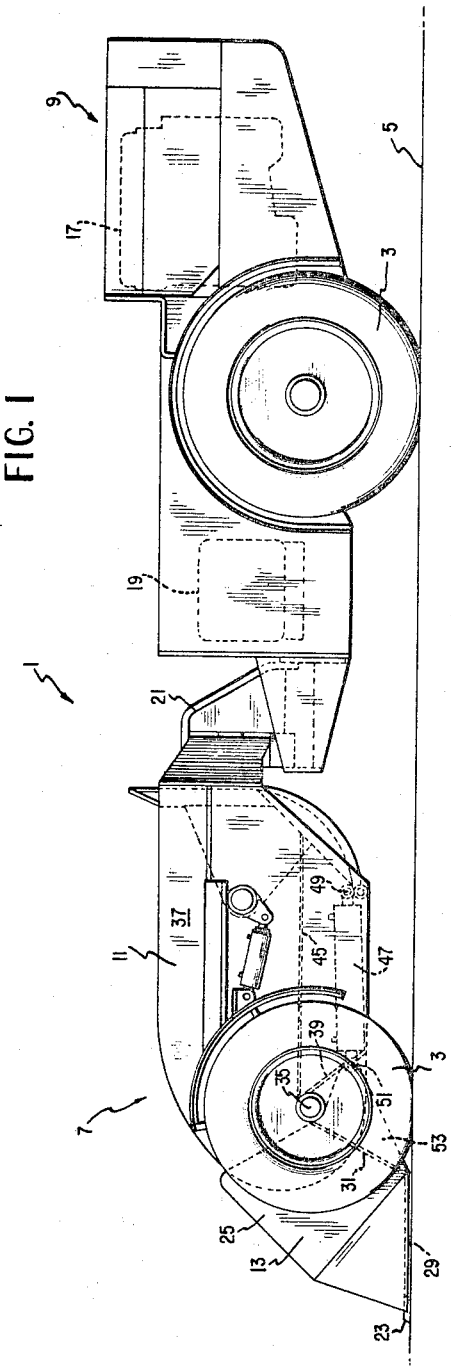
FIGURE 1 is a side elevational view of a vehicle according to the present invention.

The broad outline of the vehicle of this invention can be seen by referring to FIGURE 1 and the drawings of the above identified related applications. As is there shown, such vehicle 1 is supported by four wheels 3 on a surface 5 such as the ground, flooring or the bottom of a mine or the like. Vehicle 1 comprises a front body portion 7 articulately connected to a rear body portion 9. Body portion 7 includes a material-receiving body 11 adapted to receive, support and discharge a quantity of material, and a vertically swinging shovel 13 for digging into material and elevate and discharge such material rearwardly into body 11. The bottom of material-receiving body 11 is closed by a door that moves horizontally rearwardly to open and dump the load from body 11.

Rear body portion 9 carries an engine 17 at the rear thereof and drives rear wheels 3 through a suitable transmission. Wheels 3 may be driven and braked in any suitable manner. Rear body portion 9 also carries an operator's station 19 including the usual seat and steering wheel. A coupling 21 articulately interconnects front and rear body portions 7 and 9 so that they track properly.

Figure 2:
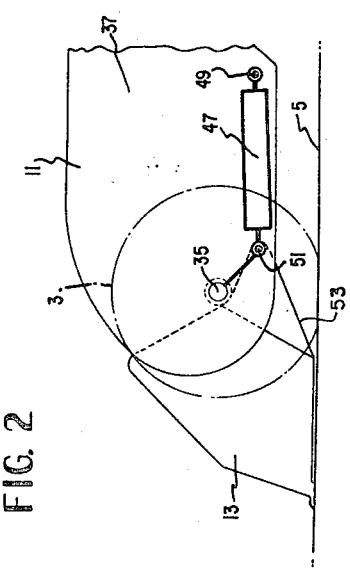
FIGURE 2 is a diagrammatic view illustrating certain mechanical relationships between the principal parts of the vertically swinging shovel in its lower position.

In operation the vehicle 1 moves close to the material to be loaded with the shovel 13 in the lowered full-line position of FIGURES 1 and 2. The vehicle 1 is then crowded forward to shove the front open end of the shovel into the material to load the front portion of the shovel 13 without undue crowding effort. After being loaded, the shovel 13 is swung forwardly and upwardly from the position of FIGURE 2 to the position of FIGURE 3, to complete the loading of the shovel 13 and to discharge the load from the shovel 13 into the material-receiving body 11. Shovel 13 is returned to a lowered position and the loading operation is repeated as needed until the material-receiving body 11 contains the desired load, whereupon the vehicle 1 can be driven from the loading station to a dumping station. When the material in the material-receiving body 11 has been carried to its destination, the door can be opened by retracting it horizontally rearwardly to unload the material-receiving body 11.

In detail, shovel 13 at the front of the vehicle is provided with teeth 23 to facilitate the penetration of the forward lower edge of the shovel into the material to be loaded. Shovel 13 also has opposite side walls 25 to confine the material and a bottom wall 27 that supports the material. Bottom wall 27 comprises a front portion 29 that is contiguous to the ground when shovel 13 is in a lower or ground-engaging position as seen in FIGURE 1 and a rear portion 31 that is upwardly and rearwardly inclined when the shovel 13 is in its lower position. Rear portion 31 terminates at its upper rear edge in a hinge element 33. Shovel 13 is thus mounted for vertical swinging movement on a horizontal axis that is disposed sufficiently high to assure that shovel 13 will have desirably large capacity but sufficiently low that shovel 13 will require only a minimum of headroom when raised. Preferably shovel 13 is mounted on the axle 35 with hinge element 33 encircling and rotatably bearing on axle 35 so that shovel 13 swings coaxially with wheels 3. The diameter of wheels 3 is selected so that the axis of shovel 13 is positioned at the desired height. Thus, as illustrated the axis of rotation of the shovel 13 is coincident with the axis of rotation of the wheels 3, that is, the central longitudinal axis of axle 35. Axle 35 is preferably a single elongated member, however, mechanical equivalents such as axle sections extending outwardly of the body 11 may be utilized. Similarly, the shovel 13 may be pivotably secured to spindles extending outwardly of the body 11 rather than pivot about the axle 35; however, with such modification the pivot axis of the shovel 13 is located adjacent the axle 35 to obtain the capacity and low headroom previously stated.

Material-receiving body 11 is made up of a pair of opposite generally vertical side walls 37 and a downwardly rearwardly inclined bottom wall 39 that is fixedly secured between side walls 37 and terminates at its upper forward edge closely adjacent hinge element 33. A collar is rigidly mounted on axle 35 adjacent each end inwardly of wheels 3 and carries a plate that bears against the outer side of side walls 37 where axle 35 passes through those side walls. These plates are rigidly attached to side walls 37 so that the collars restrain side walls 37 against inward and outward movement under the influence of a load and axle 35 ties together the side walls to strengthen the vehicle structure.

A pair of inwardly downwardly inclined wing portions 45 on the inner sides of side walls 37 provide hoods under and within which are disposed fluid motors 47 one on either side of material-receiving body 11, as is seen in FIGURE 5. As shown, fluid motors 47 comprise an axially extensible hydraulic jack having a cylinder end and a rod end as is well known in the art. At their rear cylinder ends, motors 47 are mounted on body 11 for vertical swinging movement about a rear pivotal axis at 49; and at their forward rod ends, fluid motors 47 and shovel 13 are pivotably interconnected for vertical swinging movement relative to each other about a forward pivotal axis 51. Specifically, ears 53 extend rearwardly from adjacent opposite sides of the rear of shovel 13 and provide at their rear ends pivotal interconnections with the forward ends of the piston rods of fluid motors 47. Fluid motors 47 each have inlet and outlet conduits (not shown) by which they are supplied with pressure fluid from a source of pressure fluid (not shown) as desired in any suitable well known manner.

Figure 3:
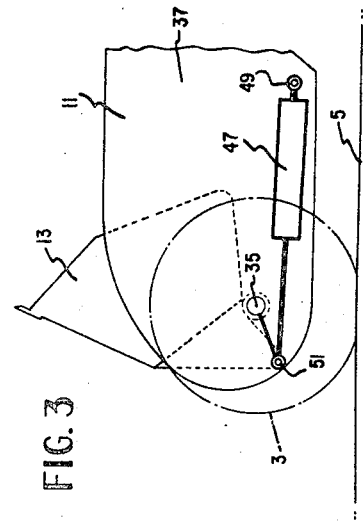
FIGURE 3 is a view similar to FIGURE 2 but showing the same relationships when the shovel is in an upper position.

The operation of the self-loading vehicles as thus far described can best be seen by a comparison of FIGURES 1, 2 and 3. After the vehicle has been crowded into the material to be loaded, with shovel 13 in the position of FIGURES 1 and 2, fluid motors 47 are actuated to swing shovel 13 from the position of FIGURE 2 to the position of FIGURE 3. The relationship of the angles of the various portions of the shovel and its actuating means are an important feature of this invention and can best be seen by a consideration of FIGURES 2 and 3. Let it be considered that there are three points of articulation in the shovel-actuating mechanism: the axis of vertical swinging movement of shovel 13, which could have a number of different positions but which is shown by way of example in the figures as being coaxial with the axle 35; the rear pivotal axis 49 of fluid motors 47; and the front pivotal axis 51 which is the joint between the fluid motors and the shovel. Let it be considered that the axis of shovel 13 and axis 51 lie in a first common plane, and that axes 49 and 51 lie in a second common plane which also includes the axes of fluid motors 47. Thus, the thrust that raises shovel 13 from the position of FIGURE 2 to the position of 3 is always applied axially of fluid motors 47.

In FIGURE 2 such two planes are at an obtuse angle to each other. As fluid motor 47 is extended the angle between the two planes passes through a right angle and becomes an acute angle of progressively greater acuity, until the position of FIGURE 3 is reached, in which the two planes are disposed at an acute angle to each other which is less than 90°. For example, the obtuse angle between the planes as seen in FIGURE 2 may be about 120°, while the acute angle between the planes as seen in FIGURE 3 may be around 20°. Thus, the total arc traversed by axis 51 would be about 100°, the two planes being at right angles to each other after about 30° of that arc has been traversed. Thus, axis 51 traverses a substantially greater arc after the planes are disposed at right angles to each other than before the planes are disposed at right angles to each other.

Another feature of the upward swinging movement of shovel 13, is that by virtue of the configuration of shovel 13, it serves in its raised position both as a forward and upward extension of inclined bottom wall 39 of material-receiving body, with which it is in alignment at that time, and also as a means not only for throwing its own load to the rear but also for forcing to the rear the load previously deposited in the material-receiving body. This last function arises by virtue of the fact that portion 29 of shovel 13 is upwardly rearwardly inclined in the uppermost position shown in FIGURE 3.

It is also important to note that the inclined portion 31 of shovel 13, the hinge element 33, and downwardly inclined bottom wall 39 of material-receiving body 11 all coact to provide a substantially continuous material-receiving and supporting surface from the shovel over the axle and into the material-receiving body. The configuration of elements 31 and 39, in conjunction with their locations relative to axle 35, assures that there will be a substantially continuous material-supporting surface that extends up and over the axle and that in all positions of shovel 13 assures against the provision of pockets in which material may be caught and held. At the same time, inclined bottom wall 39 provides a forward carrier to prevent material in body 11 from spilling back out of body 11.

What I claim is:

1. A self-loading vehicle comprising: an elongated material-receiving body; mobile means engageable with a ground surface for supporting said material-receiving body; said mobile means being rotatable about an axis of rotation extending laterally of said material-receiving body; said material-receiving body having a forward edge; a front-loading shovel having a ground engaging portion and an upwardly extending rear wall; said rear wall terminating in a rear portion mounted on said vehicle forwardly adjacent said front edge of said material-receiving body for pivotal movement about a pivot axis; said pivot axis extending laterally of said material-receiving body and being coincident with said axis of rotation; elongated power means pivotally connected at one end to said material-receiving body and at the other end to said shovel for swinging said shovel about said pivot axis; said power means having a longitudinal axis disposed at all times below a horizontal plane including said pivot axis.

2. A vehicle having: a material-receiving body member comprising transversely spaced side portions and a floor portion, mobile means supporting said body member for movement over a surface, said mobile means comprising spaced members rotatable about a common axis, a front loading shovel having a rear wall portion extending between said side portions mounted at its effective upper edge on said body member adjacent the front edge of said floor member for pivotable movement about a pivot axis coincident with said common axis parallel and adjacent to said upper edge of said rear wall portion, extensible power means pivotably connected at one end to said material receiving body and at the other end to said shovel for swinging said shovel about said pivot axis, and said power means being extensible along a path disposed at all times between said pivot axis and said surface.

3. A vehicle as set forth in claim 2 in which said other end of said power means moves between locations spaced on opposite sides of a vertical plane including said pivot axis.

4. A vehicle as set forth in claim 3 in which that one of said locations on the side of said plane nearer said one end is spaced from said plane a lesser distance than the distance the other of said locations is spaced from said plane.

5. A vehicle as specified in claim 2 wherein said pivot axis and said common axis are coplanar in a horizontal plane.

6. A vehicle having: a material-receiving body member, mobile means supporting said body member for movement over a surface, said mobile means comprising a pair of wheels mounted on respective end portions of a common axle, a front loading shovel having a rear wall portion mounted on said member for pivotable movement about an intermediate portion of said common axle, extensible power means pivotally connected at one end to said material-receiving body and at the other end to said shovel for swinging said shovel about the longitudinal axis of said common axle, and said power means extensible along a path disposed at all times between said axis and such surface.

7. A vehicle as specified in claim 6 wherein said shovel and said power means are between the side walls of said body member.

8. A vehicle as set forth in claim 6 wherein said shovel has an upwardly extending rear wall which forms an angle greater than 45 degrees with such a surface when said shovel is in its lower position, said rear wall terminating in an upper edge portion pivotally mounted on said axle.

9. A vehicle as specified in claim 8 wherein said shovel has a bottom wall contacting such a surface when in said lower position said rear wall and said bottom wall forming a substantially continuous material supporting surface.

10. A vehicle as specified in claim 6 wherein said power means is a pair of extensible hydraulic cylinders connected to said shovel at spaced points for parallel simultaneous operation by a hydraulic circuit communicating with said cylinders.

References Cited

UNITED STATES PATENTS

| | | | |
|---|---|---|---|
| 1,508,857 | 9/1924 | Pratt | 214—90 |
| 1,606,234 | 11/1926 | Jordan | 214—78 XR |
| 2,439,001 | 4/1948 | Hippard | 214—78 |
| 2,544,505 | 3/1951 | Kronhaus | 214—78 |
| 2,845,192 | 7/1958 | Klaus | 214—504 XR |

ALBERT J. MAKAY, *Primary Examiner.*

GERALD M. FORLENZA, *Examiner.*